(12) United States Patent
Demos

(10) Patent No.: US 6,975,680 B2
(45) Date of Patent: Dec. 13, 2005

(54) MACROBLOCK MODE DECISION BIASING FOR VIDEO COMPRESSION SYSTEMS

(75) Inventor: Gary A. Demos, Culver City, CA (US)

(73) Assignees: Dolby Laboratories, Inc., San Francisco, CA (US); Dolby Laboratories Licensing Corporation, San Francisco, CA (US)

( * ) Notice: Subject to any disclaimer, the term of this patent is extended or adjusted under 35 U.S.C. 154(b) by 118 days.

(21) Appl. No.: 09/905,040

(22) Filed: Jul. 12, 2001

(65) Prior Publication Data

US 2003/0108102 A1 Jun. 12, 2003

(51) Int. Cl.[7] .............................................. H04B 1/66
(52) U.S. Cl. ..................... 375/240.02; 375/240.08; 375/240.24; 375/240.25; 375/240.26; 382/239; 382/233; 382/238
(58) Field of Search ............ 375/240.02, 240.08, 375/240.24, 240.25, 240.26, 240.12, 240.13, 240.23, 240.03; 382/239, 233, 238; 348/423

(56) References Cited

U.S. PATENT DOCUMENTS

| | | | | |
|---|---|---|---|---|
| 5,617,145 | A | * 4/1997 | Huang et al. | 348/423.1 |
| 5,771,081 | A | 6/1998 | Lee | |
| 5,963,673 | A | * 10/1999 | Kodama et al. | 382/239 |
| 5,991,447 | A | * 11/1999 | Eifrig et al. | 382/236 |
| 6,057,884 | A | * 5/2000 | Chen et al. | 375/240.16 |
| 6,192,081 | B1 | * 2/2001 | Chiang et al. | 375/240.16 |
| 6,236,760 | B1 | 5/2001 | Bagni et al. | |
| 6,351,563 | B1 | 2/2002 | Kim et al. | |
| 6,430,222 | B1 | 8/2002 | Okada | |
| 6,434,196 | B1 | * 8/2002 | Sethuraman et al. | 375/240.12 |
| 6,449,312 | B1 | * 9/2002 | Zhang et al. | 375/240.16 |
| 6,493,385 | B1 | * 12/2002 | Sekiguchi et al. | 375/240.03 |

* cited by examiner

*Primary Examiner*—Shawn S. An
(74) *Attorney, Agent, or Firm*—Fish & Richardson P.C.

(57) ABSTRACT

A method, system, and computer program for coding video frames in a video compression system. One aspect includes automatically scaling coding mode biases as a function of the number of bits of coding precision in the video compression system, or dynamic range and/or contrast range, or quantization parameter. Another aspect includes selecting coding mode biases as a function of the total number of bits required for macroblock coding, or setting all biases to zero. Another aspect includes selecting one of a plurality of coding modes (1) resulting in no more than a selected number of coded bits, or (2) having at least a selected image quality, or (3) having a combination of number of coded bits and image quality. Another aspect includes selecting, as a preferred coding mode, one of a plurality of coding modes having a selected combination of number of coded bits and image quality based on various AC and DC motion vectors. Another aspect includes selecting, as a preferred frame coding choice, one of a plurality of frame coding choices having a selected combination of number of coded bits and image quality. The number of coded bits can also be determined for a set of selected quantization parameter (QP) values or quantization frequency weighting matrices, for each frame coding choice. This approach may also be used to select a preferred QP value or quantization frequency weighting matrix.

35 Claims, 1 Drawing Sheet

MACROBLOCK MODE DECISION BIASING FOR VIDEO COMPRESSION SYSTEMS

TECHNICAL FIELD

This invention relates to video compression, and more particularly to biasing of macroblock mode decisions in MPEG-like video compression systems.

BACKGROUND

MPEG Background

MPEG-2 and MPEG-4 are international video compression standards defining a video syntax that provides an efficient way to represent image sequences in the form of more compact coded data. The language of the coded bits is the "syntax." For example, a few tokens can represent an entire block of samples (e.g., 64 samples for MPEG-2). Both MPEG standards also describe a decoding (reconstruction) process where the coded bits are mapped from the compact representation into an approximation of the original format of the image sequence. For example, a flag in the coded bitstream signals whether the following bits are to be preceded with a prediction algorithm prior to being decoded with a discrete cosine transform (DCT) algorithm. The algorithms comprising the decoding process are regulated by the semantics defined by these MPEG standards. This syntax can be applied to exploit common video characteristics such as spatial redundancy, temporal redundancy, uniform motion, spatial masking, etc. In effect, these MPEG standards define a programming language as well as a data format. An MPEG decoder must be able to parse and decode an incoming data stream, but so long as the data stream complies with the corresponding MPEG syntax, a wide variety of possible data structures and compression techniques can be used (although technically this deviates from the standard since the semantics are not conformant). It is also possible to carry the needed semantics within an alternative syntax.

These MPEG standards use a variety of compression methods, including intraframe and interframe methods. In most video scenes, the background remains relatively stable while action takes place in the foreground. The background may move, but a great deal of the scene is redundant. These MPEG standards start compression by creating a reference frame called an "intra" frame or "I frame". I frames are compressed without reference to other frames and thus contain an entire frame of video information. I frames provide entry points into a data bitstream for random access, but can only be moderately compressed. Typically, the data representing I frames is placed in the bitstream every 12 to 15 frames (although it is also useful in some circumstances to use much wider spacing between I frames). Thereafter, since only a small portion of the frames that fall between the reference I frames are different from the bracketing I frames, only the image differences are captured, compressed, and stored. Two types of frames are used for such differences— Predicted or P frames, and Bi-directional Interpolated or B frames.

P frames generally are encoded with reference to a past frame (either an I frame or a previous P frame), and, in general, are used as a reference for subsequent P frames. P frames receive a fairly high amount of compression. B frames provide the highest amount of compression but require both a past and a future reference frame in order to be encoded. Bi-directional frames are never used for reference frames in standard compression technologies.

Macroblocks are regions of image pixels. For MPEG-2, a macroblock is a 16×16 pixel grouping of four 8×8 DCT blocks, together with one motion vector for P frames, and one or two motion vectors for B frames. Motion vectors describe the relative movement of a block of pixels between frames.

Macroblocks within P frames may be individually encoded using either intra-frame or inter-frame (predicted) coding modes. Macroblocks within B frames may be individually encoded using any of several coding modes: standalone intra-frame coding, forward predicted coding, backward predicted coding, or both forward and backward (i.e., bi-directionally interpolated) predicted coding. In addition to these coding modes, MPEG-4 also supports a second interpolative motion vector prediction mode: direct mode prediction using the motion vector from the subsequent P frame, plus a delta value.

After a coding mode decision is made, and the input video is coded accordingly, an MPEG data bitstream comprises a sequence of I, P, and B frames. A sequence may consist of almost any pattern of I, P, and B frames (there are a few minor semantic restrictions on their placement). However, it is common in practice to have a fixed pattern (e.g., IBBPBBPBBPBBPBB).

It is known to apply various biases to favor selection of one coding mode versus another mode. These biases are implemented statically (hardwired) in the reference MPEG-2 and MPEG-4 software encoders, generally as a positive or negative value added to a match measure, such as the sum of absolute differences ("SAD"). For example, there are biases to favor direct mode coding of B frames. There are also biases to favor or not favor intra macroblock coding mode decisions (in P frames of MPEG-4, and in P and/or B frames of MPEG-2).

For P frames, the mode decisions for MPEG-2 are between intra (stand alone) coding and forward-predicted coding with a motion vector. In MPEG-4, an additional choice is provided to allow the 16×16 macroblock to be split into four 8×8 blocks, corresponding to the four 8×8 DCT blocks, with each having a motion vector. Again, hardwired biases typically are applied to these mode decisions.

There are other biases that are also of relevance. For example, typically there is a bias toward favoring a zero motion vector. Since a zero motion vector will usually code more compactly than a non-zero vector, if the zero vector's match is only slightly inferior to the best non-zero vector match (using, for example, the Sum of Absolute Difference—SAD—algorithm in MPEG), then the bias causes the zero vector to be selected.

In the MPEG-2 and MPEG-4 software reference encoders, all of these mode decision biases are statically set relative to 8-bit significance in coding. In general, a bias is set at approximately one least significant bit (usually multiplied by the macroblock area) within the 8-bits available for coding (i.e., 1/256th of the maximum white value). Note also that all mode decisions in MPEG-2 and MPEG-4 are based upon luminance (Y channel) values only.

In MPEG encoding, the intra versus predicted macroblock decision is made based upon self-relative energy of the intra coding versus the minimum SAD from predicted (inter) coding. This decision attempts to minimize coded bits by estimating the coefficient energy (without reference to the quantization parameter, QP) of the intra versus the difference macroblock coding. This is done without applying the DCT transform in the MPEG-2 and MPEG-4 reference encoding software, and without applying the actual QP value. Rather, a simpler self-energy measure is determined by comparing using the actual macroblock pixels and the difference pixels, and selecting which ever is smaller after adding the static bias value. Again, the bias toward intra coding is set statically (hard-wired) in the MPEG-2 and MPEG-4 reference encoders, and is based upon static assumptions of precision (i.e., 8-bit) and coding overheads.

SUMMARY

The invention includes a method, system, and computer program for coding video frames in a video compression system.

In one aspect, the invention includes automatically scaling coding mode biases as a function of (1) the number of bits of coding precision used to code video frames in the video compression system, or (2) at least one of the dynamic range and contrast range of at least one image unit of such video frames, or (3) a quantization parameter associated with the video frames.

In another aspect, the invention includes selecting coding mode biases as a function of the total number of bits required for macroblock coding of at least one region within a frame, or setting all biases to zero.

In another aspect, the invention includes selecting a plurality of coding modes; applying each coding mode to at least a macroblock within at least one video frame; determining the number of coded bits for each such coding mode; and selecting, as a preferred coding mode, one of the plurality of coding modes (1) resulting in no more than a selected number of coded bits, or (2) having at least a selected image quality, or (3) having a selected combination of number of coded bits and image quality.

In another aspect, the invention includes determining an AC motion vector corresponding to an AC match of macroblocks of at least two frames; determining a DC motion vector corresponding to a DC match of macroblocks of at least two frames; selecting a plurality of coding modes; applying each coding mode to at least one macroblock within at least one video frame using each of the AC and DC motion vectors to create a set of candidate image codings; determining a measure of image quality for each candidate image coding; selecting, as a preferred coding mode, one of the plurality of coding modes having a selected combination of number of coded bits and image quality; and selecting, as an overall motion vector, the AC or DC motion vector corresponding to the preferred coding mode.

In another aspect, the invention includes selecting a plurality of frame coding choices (e.g., coding mode, QP value, quantization frequency weighting matrices, etc.); applying each frame coding choice to at least one macroblock within at least one video frame; determining a measure of image quality for each such frame coding choice; determining the number of coded bits for each such frame coding choice; and selecting, as a preferred frame coding choice, one of the plurality of frame coding choices having a selected combination of number of coded bits and image quality. The number of coded bits can also be determined for a set of selected quantization parameter (QP) values or quantization frequency weighting matrices, for each frame coding choice. This approach may also be used to select a preferred QP value or quantization frequency weighting matrix.

The invention includes corresponding computer program implementations and apparatus implementations.

The details of one or more embodiments of the invention are set forth in the accompanying drawings and the description below. Other features, objects, and advantages of the invention will be apparent from the description and drawings, and from the claims.

DESCRIPTION OF DRAWING

Like reference symbols in the various drawings indicate like elements.

DETAILED DESCRIPTION

Variable Biases for Coding Mode Decisions

Figure 1:
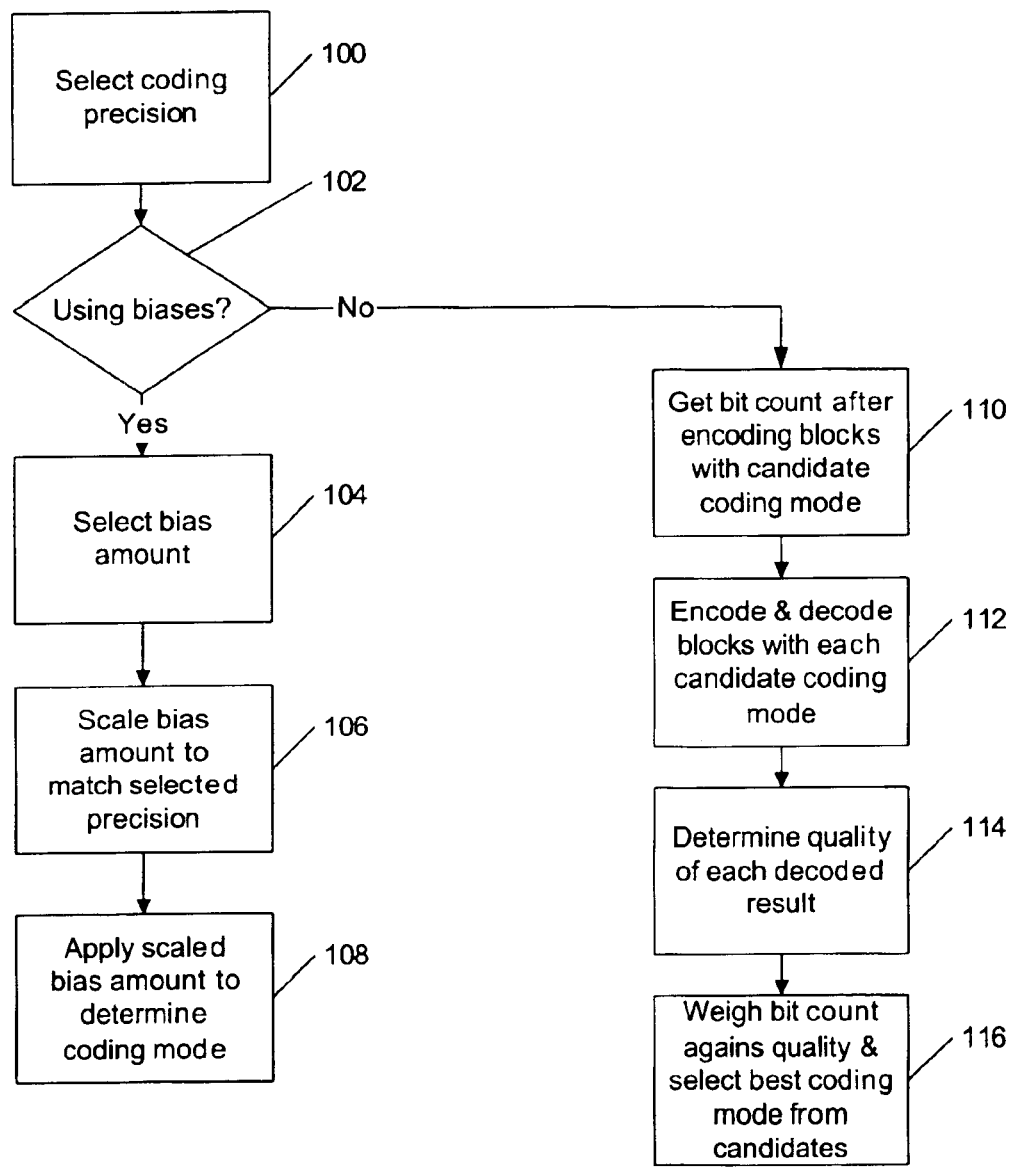
FIG. 1 is a flowchart showing an illustrative embodiment of the invention as a method that may be computer implemented.

As noted above, the coding modes used for B and P macroblocks have hardwired static biases in the reference MPEG-2 and MPEG-4 software encoders. MPEG-2 is limited to 8-bit coding of pixels, and the biases are set to match. In MPEG-4, although the number of coded bits can be extended to more than 8 bits, the biases are set such that they are only appropriate to 8-bit coding. A set of static biases could be designed which match a higher number of bits, which would provide for appropriate mode decisions for higher dynamic range coding, such as 10-bits. However, a set of biases set for 10-bits would not be suitable for 9, 11, or any other number of bits.

One aspect of the invention is thus directed to a system and method for scaling coding biases depending upon the number of bits being coded. For example, many match criteria (such as SAD) can utilize biases scaled to a fraction of a least significant bit (LSB) (such as $\frac{2}{3}$ of an LSB) for all numbers of coded bits. The actual amount of LSB to use is generally empirically determined based on a desired output quality vs. coding savings. Generally, a smaller bias is used when the available bit savings for a particular coding mode is small, and a larger bias is used when the available bit savings for a particular coding mode is large.

In addition, it has been found useful to further extend the notion of matching bias amounts to local dynamic range or local contrast. For example, in a bright image region, the QP value might be set such that the local dynamic range is equal to 10-bit coding. (See co-pending U.S. patent application Ser. No. 09/798,346, entitled "High Precision Encoding and Decoding of Video Images", assigned to the assignee of the present invention, and hereby incorporated by reference, for additional information on the use of QP in enhancing video compression coding). However, in a dark region, the local QP value might be set much lower, such that the local dynamic range might still be 10-bits, but relative to a local white value, which might be several bits down in significance relative to the values for a bright region.

In particular, if a dark region uses a portion of the range corresponding to the low 10-bits of significance (values 0 to 1023) from a 14-bit dynamic range (values 0 to 16383), then the biases in the dark region might be set for the lowest of the 14 bits (corresponding to a range of 0 to 1023). However, a high brightness (or, similarly, a high contrast region) might use four bits higher, and thus have values 16-times larger for the biases, to make the biases match the high 10 bits (corresponding to values 16 to 16384, in steps of 16) which will be selected by the appropriate QP value for that region. In this way, coding mode decision biases can be uniformly applied to wide dynamic range images.

Similarly, coding mode decision biases may be adjusted for images having wide contrast ranges. For example, low contrast ranges, corresponding to a 10-bit dynamic range, but set in the middle of a 14-bit range (e.g., representing the 1024 values between 8192 and 9216), can also beneficially utilize corresponding mode decision biases. The biases might be set relative to the 10-bits of local contrast range, but applied at the prevailing DC brightness point (centered in the 8192 to 9216 range in this example). This is equivalent to the mode decision operating point and QP operating value used in the dark region (low 10 bits of 14 in the previous example) of a wide dynamic range image.

Thus, low contrast and dark regions benefit from biases matching the lowest bits of significance for such regions. High contrast and wide-dynamic range image regions benefit from biases matching the local contrast range, thus representing greatly increased bias amounts.

The bias amounts for macroblock mode decisions can be set based upon a local QP value for the image or image region. Since the local QP value determines the coding quantization and significance of a region, it is also an appropriate factor in determining optimal coding mode decision biases. For example, high QP in a high contrast region might correspond to 10 bits of significance. If the bias is set at ⅔ of an LSB, the bias value would thus be set as ⅔ of the $10^{th}$ bit. A low QP might correspond to 13 bits of significance. If the bias is set at ⅔ of an LSB, the bias value would thus be set as ⅔ of the $13^{th}$ bit (thus being ⅛ of the bias amount of the case where QP corresponds to 10 bits of significance).

Alternatives to Biasing

If all coding biases are set to zero, coding mode decisions will operate correctly over a wide dynamic and contrast range. Thus, as an alternative to adjusting mode decision biases based upon image contrast or dynamic range, all biases can be eliminated to ensure that macroblock mode decisions function properly over the full wide dynamic and contrast range. However, any benefits of using biases to improve macroblock coding mode decisions would be lost.

The present invention also encompasses a number of techniques that improve on biasing in determining an optimal encoding mode. In particular, this aspect of the invention recognizes that there are other factors involved in coding mode decisions that are not fully addressed by the use of biases.

For example, in the case of the intra-coding decision for P macroblocks in MPEG-4, and P or B macroblocks in MPEG-2, the main benefit of a bias relates to the overhead of coded motion vector bits. However, this overhead is not static, as implied by the MPEG-2 and MPEG-4 reference software static bias settings. Motion vector overhead is related to the length of motion vectors. The length of motion vectors is related to M (i.e., the distance between consecutive P frames) and to image resolution. The number of bits utilized is also related to the coding method for the corresponding motion vectors (for example, as a delta from the median of neighboring motion vectors). In the case of resolution enhancement layers using guide vectors, the range of motion vector lengths is relatively small, independent of resolution, and independent of the value of M. However, resolution enhancement layers are predicted by a base layer and a previous enhancement frame using motion compensation, thus rarely requiring intra coding. (Guide vectors are more fully described in co-pending U.S. patent application Ser. No. 09/545,233, entitled "Enhancements to Temporal and Resolution Layering", assigned to the assignee of the present invention, and incorporated by reference). Thus, it is appropriate to relate the intra macroblock coding decision to these factors.

In particular, the total number of bits required for macroblock coding can be estimated and used as a bias favoring intra coding versus the predicted (inter) coding modes. The self-relative energy measure can also be improved by performing an intra macroblock coding and an inter (predicted difference) macroblock coding, dividing each result by a selected QP value, and then applying a lossless compression algorithm (such as variable length coding (VLC) or another coding method). The number of output bits can then be examined to see which coding mode resulted in fewer coded bits. This number of bits would automatically include the bits required to code the actual motion vector that would accompany the predicted mode. The inverse decoding can also be applied, and the resulting decoded image can be subtracted from the original frame, to determine the luminance SNR (Signal to Noise Ratio) of the two coding modes. The lowest SNR determines the better quality match to the original image. In addition to the luminance SNR, other quality match methods can also be used. For example, chroma SNR and/or RGB SNR can be computed in addition to or in lieu of the luminance SNR, to determine which coding mode produces better color quality. Further, power spectrum differences between an original video frame compared to a coded and decoded video frame can be determined, to see which method provides better sharpness and detail. Note that power-spectral differences provide the best AC match as well as the best DC match, whereas SNR measurements are a DC quality measurement.

By combining some or all of these methods, all macroblock coding mode decisions can be improved over the simple static (hard-wired) bias settings that are used in the MPEG-2 and MPEG-4 software reference encoder.

In the same way that applying more of the encoding process can benefit the intra versus inter macroblock coding mode decision, this additional information can be applied to improve all macroblock mode decisions. For example, the use of a bias on the SAD determination (which is the decision mechanism used in the MPEG-2 and MPEG-4 software reference encoders for determining the coding mode) can be improved by applying these forms of additional information to the macroblock coding mode decision. Thus, applying these techniques to P frames (and B frames in MPEG-2), intra (stand-alone) versus inter (motion vector predicted) coding can be determined. For B frames, forward prediction versus backward prediction versus interpolative prediction can also be tested using quality measures and bit measures to select the best coding choice. Similarly, for MPEG-4, direct mode can also be tested and compared against other coding modes.

Motion Vector Selection

For each macroblock, the AC match can be measured in addition to the DC match as candidates for best motion vector selection (See co-pending U.S. patent application Ser. No. 09/904,192, entitled "Motion Estimation for Video Compression Systems", filed concurrently herewith, assigned to the assignee of the present invention, and hereby incorporated by reference, for additional information on motion vector estimation). Motion vectors from the best macroblock DC match can be used for every candidate macroblock coding mode decision. Then motion vectors from the best AC match can be used in a similar fashion. The coded image quality and the bit counts of both candidate motion vectors, for each candidate mode decision, can then be considered in determining the best motion vector to use with the best macroblock coding mode decision. Thus, an optimal or near optimal tradeoff can be determined between quality and cost (bit count).

Further, it is beneficial to determine the impact of a particular P frame coding mode and motion vector set on preceding or succeeding B frames. This is of particular significance in MPEG-4 style coding, where direct mode coding utilizes the following P frame's motion vector. Thus, for example, the candidate coding modes and motion vectors of a macroblock in a P frame can be weighed not only against the coded quality and bit count for that P frame, but also against the coded quality and bit count of directly prior B frames. For example, a coding mode can be selected that is slightly less than optimal for a P frame, but is more optimal for the directly prior B frames, and thus may be preferable with respect to overall bit count and image quality.

QP Testing

Of particular significance to the best coding mode decisions for wide dynamic range and wide contrast range images is the use of the local QP (and quantization frequency weighting matrix) as a factor in determining the best macroblock coding mode decision. For example, the number of bits generated during macroblock coding are highly dependent upon the value of QP. Biases attempt to generalize motion vector bit overheads, quantization affects, and relative coefficient weights (as determined by QP and the quantization frequency weighting matrix) to estimate the better decision. Comparisons of both quality of encoding/decoding (such as by determining which has a lower SNR), and the number of bits generated utilizing the actual QP value, yield a more optimal decision criteria for determining macroblock coding modes than do biases.

Thus, other frame coding choices, such as QP and the quantization frequency weighting matrix, can form a significant factor in selection of the optimal coding mode decision. Further, various coding mode decisions can be tested with a variety of QP values (and/or matrices) to determine image quality and number of bits, not only for each coding mode decision, but for various values of QP (and/or matrices) as well. By testing various candidate QP values (and/or matrices) together with the various candidate coding mode decisions, a wider range of information is available to optimize frame coding choices, coding efficiency, and quality. For example, for one QP value, one coding mode might be more optimal, while for a slightly different QP value, a different coding mode might be more optimal. By such combined coding comparison, the coding quality can be optimized and the number of bits minimized by selecting the best QP (and/or quantization frequency weighting matrix) and coding mode decision combination to meet a particular criteria of coding quality and low bit count. While quality generally increases as the number of bits increases, it is often the case that there will be "sweet spots" where the quality benefits, and the compactness of the bits generating that quality, together will recommend a specific choice of QP (and/or quantization frequency weighting matrix) and coding mode.

This technique can be helpful in coding wide dynamic range and wide contrast range images, since QP and the quantization frequency weighting matrix (which controls the quantization as a function of spatial frequency) play a central enabling role in expanding dynamic range and contrast range. Coding mode decisions, especially in conjunction with B frames (where there are many more possible choices), are best made in conjunction with the selection of a local value for QP and a quantization frequency weighting matrix.

Illustrative Method for Improved Coding Mode Decisions

FIG. 1 is a flowchart showing an illustrative embodiment of the invention as a method that may be computer implemented:

Step 100: In an image compression system, establish a coding precision for a desired decoded quality, as represented by number of bits (e.g., 12 bit precision), for the compression of an image unit (e.g., group of frames, a frame, a region within a frame, a macroblock, or similar work unit).

Step 102: If using biases, branch to Step 104; otherwise, branch to Step 110 to use coded quality and number of bits to make a coding mode decision.

Step 104: Select a bias amount for each coding mode decision for macroblocks within the selected work unit; for example, select a ½ LSB bias in favor of the 16×16 inter mode over the 8×8 inter mode (4 vectors) in MPEG4 P frames. The categories of decision include intra versus inter coding in P frames, 16×16 versus 8×8 MPEG4 P frames, zero motion vectors in P and B frames, and forward versus backward versus interpolative versus direct (MPEG4) or intra (MPEG2) in B frames.

Step 106: Automatically scale the bias amounts to match the coding precision.

Step 108: Apply the scaled bias amount when selecting a coding mode for encoding macroblocks.

Step 110: Encode each macroblock with each candidate coding mode to determine the number of bits created by each candidate coding mode.

Step 112: Encode and decode each macroblock to determine a decompressed result from each candidate coding mode.

Step 114: Make quality measurements of the decompressed result of each candidate coding mode. For example, compute a selected SNR value for each decompressed result.

Step 116: Weigh the minimization of the number of bits against the maximization of quality in order to select the best coding mode from the candidates; this may be an empirical consideration of these two factors. A low SNR and low bit count are preferred over a high SNR and high bit count. A subjective determination may be made when comparing an encoding that results in a lower SNR but higher bit count with respect to another encoding.

Additional steps may optionally be applied. For example, an implementing system may test the affect of P frame coding mode decisions on the possible coding mode decisions of intervening B frames. The system would weigh the benefits of each P frame coding mode decision based not only on the efficiency (bit count) and quality (e.g., SNR value) of that P frame macroblock, but also on the intervening quality of B frames.

As another example, an implementing system may apply various QP and quantization frequency weighting matrix values to the various candidate coding mode decisions, in order to select optimal QP and quantization frequency weighting matrix values in conjunction with corresponding coding mode choices. For example, a lower QP with intra coding might give a lower bit count and higher SNR than an inter coded block.

As yet another example, an implementing system may apply both AC and DC best motion vector (MV) matches in conjunction with coding mode decisions, as well as optionally in conjunction with various values of QP and the quantization frequency weighting matrix, in order to select a best motion vector in conjunction with the optimal chosen value of QP, quantization frequency weighting matrix, and coding mode. For example, an AC match with a flat (unweighted) quantization frequency weighting matrix may give a lower bit count and higher quality than a DC match with a standard quantization frequency weighting matrix.

Summary of Coding Mode Decision Improvements

In summary, if biases are used for coding mode decisions, they should be set at values appropriate to the desired overall or local precision.

Biases have the advantage that they are simple to apply during encoding. However, biases represent generalizations. As an improvement over biases, each candidate coding mode can be encoded to determine the number of bits it generates and decoded to determine the quality of the result. The quality (e.g., SNR) and compactness (fewest number of bits) of each candidate coding decision can be compared, and the optimal coding mode decision can be made.

Additionally, various motion vectors, such as an AC match versus a DC match, can be tested, and the optimal motion vector, together with the optimal coding mode for that vector, can be selected. The affect of P frame choices on intervening B frames can also be taken into account in selecting the best P frame coding.

Further, it is beneficial to test various candidate QP values and quantization frequency weighting matrix values in conjunction with the coding mode and motion vector choices. In this way, the best QP and quantization frequency weighting matrix can also be chosen for use in conjunction with a corresponding best coding mode and motion vector.

Coding mode decisions can be improved by applying some or all of these forms of additional information.

Implementation

The invention may be implemented in hardware or software, or a combination of both (e.g., programmable logic arrays). Unless otherwise specified, the algorithms included as part of the invention are not inherently related to any particular computer or other apparatus. In particular, various general purpose machines may be used with programs written in accordance with the teachings herein, or it may be more convenient to construct more specialized apparatus (e.g., integrated circuits) to perform particular functions. Thus, the invention may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described. Accordingly, other embodiments are within the scope of the following claims.

What is claimed is:

1. A method for coding video frames in a video compression system comprising:

receiving an input image corresponding to a video frame, wherein the input image comprises a sample, and wherein the sample is represented by a number of bits;

providing a plurality of coding modes, including a first coding mode and a second coding mode;

providing a plurality of bias values, including a first bias value and a second bias value, wherein the first bias value corresponds to the first coding mode and the second bias value corresponds to the second coding mode, and wherein the second bias value is different from the first bias value;

scaling each of the plurality of bias values as a function of the number of bits representing the sample of the input image;

providing a first coding mode sum corresponding to the first coding mode, comprising adding the first bias value and a match measure;

providing a second coding mode sum corresponding to the second coding mode, comprising adding the second bias value and the match measure; and selecting a preferred coding mode from the plurality of coding modes, comprising selecting a minimum of a plurality of coding mode sums, wherein the plurality of coding mode sums includes the first coding mode sum and the second coding mode sum.

2. The method of claim 1, wherein the number of bits representing the sample of the input image is 10 bits.

3. The method of claim 1, wherein the video compression system is an MPEG-2 video compression system.

4. The method of claim 1, wherein the selecting the preferred coding mode is performed by an MPEG-2 codec.

5. The method of claim 1, wherein the selecting the preferred coding mode is performed by a first codec, the first codec being designed with the assumption that the number of bits representing the sample of the input image is 8 bits.

6. The method of claim 5, wherein the number of bits representing the sample of the input image is 10 bits.

7. The method of claim 1, wherein the first bias value is always used to calculate the first coding mode sum corresponding to the first coding mode, and wherein the second bias value is always used to calculate the second coding mode sum corresponding to the second coding mode.

8. The method of claim 1 wherein the match measure is a sum of absolute differences.

9. The method of claim 1, wherein the scaling each of the plurality of bias values comprises multiplying each bias value by four.

10. The method of claim 9, wherein the multiplying each bias value by four comprises left-shifting each bias value by two bits.

11. The method of claim 1, wherein the scaling each of the plurality of bias values is performed automatically.

12. An apparatus, stored on a computer-readable medium, for coding video frames in a video compression system, the apparatus comprising instructions for causing a computer to:

receive an input image corresponding to a video frame, wherein the input image comprises a sample, and wherein the sample is represented by a number of bits;

provide a plurality of coding modes, including a first coding mode and a second coding mode;

provide a plurality of bias values, including a first bias value and a second bias value, wherein the first bias value corresponds to the first coding mode and the second bias value corresponds to the second coding mode, and wherein the second bias value is different from the first bias value;

scale each of the plurality of bias values as a function of the number of bits representing the sample of the input image;

provide a first coding mode sum corresponding to the first coding mode, comprising adding the first bias value and a match measure;

provide a second coding mode sum corresponding to the second coding mode, comprising adding the second bias value and the match measure; and select a preferred coding mode from the plurality of coding modes, comprising selecting a minimum of a plurality of coding mode sums, wherein the plurality of coding mode sums includes the first coding mode sum and the second coding mode sum.

13. The apparatus of claim 12, wherein the number of bits representing the sample of the input image is 10 bits.

14. The apparatus of claim 12, wherein the video compression system is an MPEG-2 video compression system.

15. The apparatus of claim 12, wherein the instructions that cause the computer to select the preferred coding mode comprise instructions that cause the computer to use an MPEG-2 codec.

16. The apparatus of claim 12, wherein the instructions that cause the computer to select the preferred coding mode comprise instructions that cause the computer to use a first codec, the first codec being designed with the assumption that the number of bits representing the sample of the input image is 8 bits.

17. The apparatus of claim 16, wherein the number of bits representing the sample of the input image is 10 bits.

18. The apparatus of claim 12, wherein the first bias value is always used to calculate the first coding mode sum corresponding to the first coding mode, and wherein the second bias value is always used to calculate the second coding mode sum corresponding to the second coding mode.

19. The apparatus of claim 12, wherein the match measure is a sum of absolute differences.

20. The apparatus of claim 12, wherein the instructions that cause the computer to scale each of the plurality of bias values comprise instructions that cause the computer to multiply each bias value by four.

21. The apparatus of claim 20, wherein the instructions that cause the computer to multiply each bias value by four comprise instructions that cause the computer to left-shift each bias value by two bits.

22. The apparatus of claim 12, wherein the instructions that cause the computer to scale each of the plurality of bias values comprise instructions that cause the computer to automatically scale each of the bias values.

23. A system for coding video frames in a video compression system comprising:

means for receiving an input image corresponding to a video frame, wherein the input image comprises a sample, and wherein the sample is represented by a number of bits;

means for providing a plurality of coding modes, including a first coding mode and a second coding mode;

means for providing a plurality of bias values, including a first bias value and a second bias value, wherein the first bias value corresponds to the first coding mode and the second bias value corresponds to the second coding mode, and wherein the second bias value is different from the first bias value;

means for scaling each of the plurality of bias values as a function of the number of bits representing the sample of the input image;

means for providing a first coding mode sum corresponding to the first coding mode, comprising means for adding the first bias value and a match measure;

means for providing a second coding mode sum corresponding to the second coding mode, comprising means for adding the second bias value and the match measure; and means for selecting a preferred coding mode from the plurality of coding modes, comprising means for selecting a minimum of a plurality of coding mode sums, wherein the plurality of coding mode sums includes the first coding mode sum and the second coding mode sum.

24. The system of claim 23, wherein the number of bits representing the sample of the input image is 10 bits.

25. The system of claim 23, wherein the video compression system is an MPEG-2 video compression system.

26. The system of claim 23, wherein the means for selecting the preferred coding mode comprises an MPEG-2 codec.

27. The system of claim 23, wherein the means for selecting the preferred coding mode is comprises a first codec, the first codec being designed with the assumption that the number of bits representing the sample of the input image is 8 bits.

28. The system of claim 27, wherein the number of bits representing the sample of the input image is 10 bits.

29. The system of claim 23, wherein the first bias value is always used to calculate the first coding mode sum corresponding to the first coding mode, and wherein the second bias value is always used to calculate the second coding mode sum corresponding to the second coding mode.

30. The system of claim 23 wherein the match measure is a sum of absolute differences.

31. The system of claim 23, wherein the means for scaling each of the plurality of bias values comprises multiplying each bias value by four.

32. The system of claim 31, wherein the means for multiplying each bias value by four comprises means for left-shifting each bias value by two bits.

33. The method of claim 23, wherein the means for scaling each of the plurality of bias values comprises means for automatically scaling each of the plurality of bias values.

34. A system comprising:

means for selecting a coding precision as represented by a number of bits;

means for checking whether a coding mode bias is to be used;

means for selecting a bias amount for a coding mode decision for a macroblock, if the coding mode bias is to be used;

means for automatically scaling the bias amount to match the coding precision, if the coding mode bias is to be used; and means for applying the scaled bias amount when selecting a coding mode for encoding the macroblock, if the coding mode bias is to be used;

means for encoding the macroblock with a first one of a plurality of candidate coding modes to determine a number of bits created by the first candidate coding mode, if the coding mode bias is not to be used;

means for decoding the macroblock to determine a decompressed result from the first candidate coding mode, if the coding mode bias is not to be used;

means for making a quality measurement of the decompressed result, if the coding mode bias is not to be used; and means for selecting a best coding mode from the plurality of candidate coding modes, if the coding mode bias is not to be used.

35. The system of claim 34 wherein said means for selecting the best coding mode comprises means for weighing the number of bits created by the first candidate coding mode against the quality measurement of the decompressed result.

* * * * *